April 22, 1941.   W. M. JEFFERS   2,239,101
SYSTEM FOR SYNCHRONIZING SINGLE PHASE MOTORS
Filed May 23, 1940
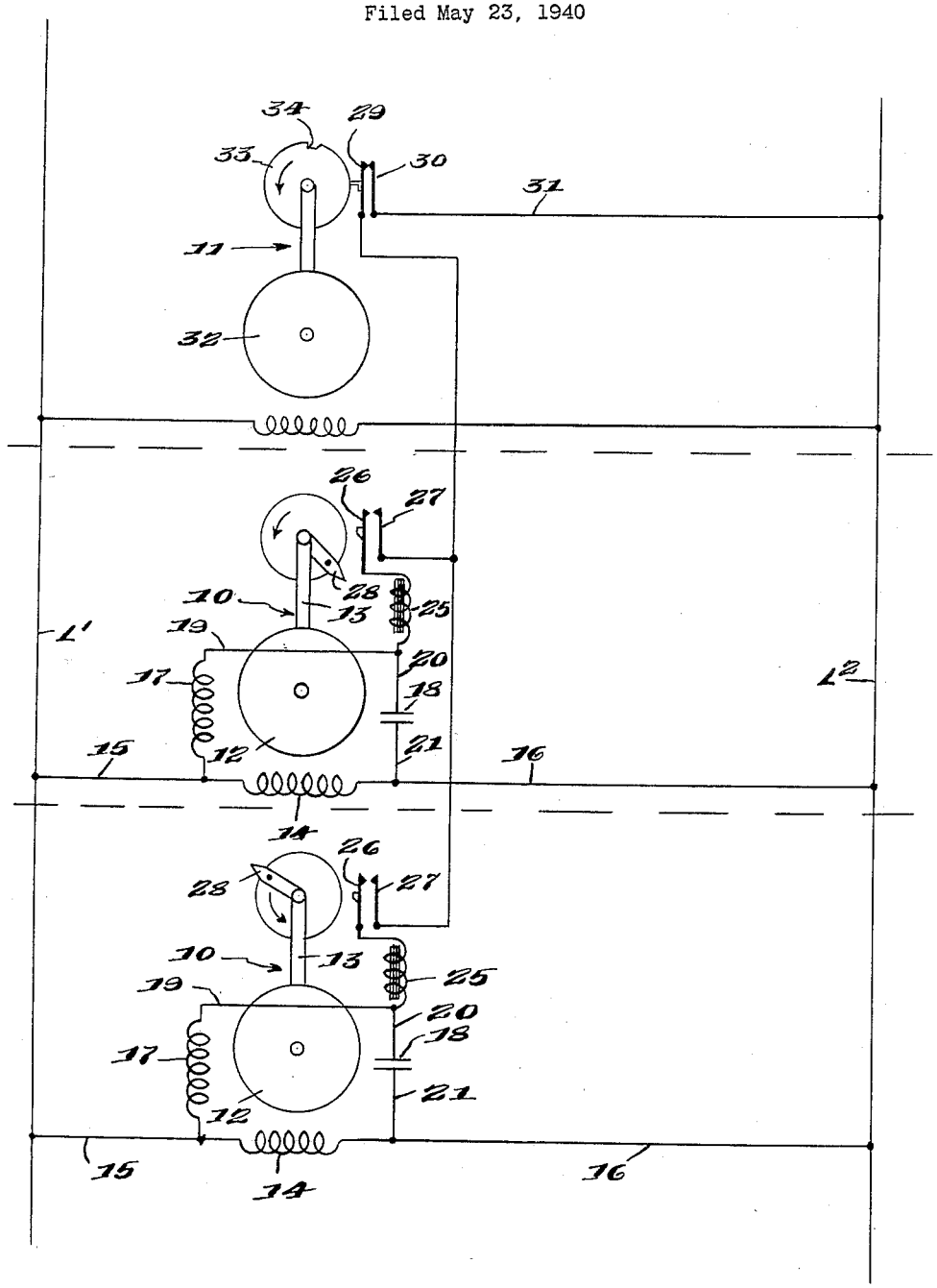
INVENTOR.
Walter M. Jeffers
BY Bodell & Thompson
ATTORNEYS.

Patented Apr. 22, 1941

2,239,101

UNITED STATES PATENT OFFICE 2,239,101

SYSTEM FOR SYNCHRONIZING SINGLE PHASE MOTORS

Walter M. Jeffers, Syracuse, N. Y., assignor to Crouse-Hinds Company, Syracuse, N. Y., a corporation of New York Application May 23, 1940, Serial No. 336,809

3 Claims. (Cl. 172—293)

This invention has to do with a system for operating one or more single phase electric motors in synchronism with a master controller.

The system is particularly suitable for operating a plurality of such motors in a traffic signaling system where it is desired that the timer motors at the various intersections shall operate in unison and in some predetermined relation.

In its more limited aspects, the invention has to do with a system of operating a plurality of single phase motors of the condenser start-condenser-run type, and the invention has as an object a particularly economical and efficient arrangement whereby motors of the type referred to are periodically checked and if any motor is out of step with the master control apparatus, the motor is stopped until it is in synchronism with the other motors of the system and is then again started.

The invention consists in the combinations and constructions hereinafter set forth, and in the system claimed.

In describing this invention, reference is had to the accompanying drawing in which like characters designate corresponding parts in all the views.

The drawing is a schematic, across the line, wiring diagram illustrating the arrangement and circuit for the various elements of the system.

In the drawing, I have illustrated the system as involving two controlled motors 10 and a master controller 11. However, it will be apparent that the system may include one controlled motor, or an indefinite number of such motors. These motors consist of a rotor 12 mounted on a shaft 13 journalled in suitable bearings, not shown, and a field element consisting of a pair of windings. The first winding 14 is connected across the line, the conductors of which are designated $L^1$, $L^2$, as by wires 15, 16. The second winding 17 is connected across the line in series with a phase displacement means which is shown as a capacitor 18. One side of the coil 17 is connected to the source $L^1$ as by wire 15, and the opposite side of the coil to one side of the condenser 18 as by wires 19, 20, and the opposite side of the condenser is connected to the wire 16 by wire 21.

The arrangement described illustrates the conventional capacitor start, capacitor run, motor. The condenser 18 is in the nature of a capacitive reactance and functions to cause the current in the coil 17 to lead the current in coil 14 thereby producing a rotating field to effect rotation of the rotor 12. This construction is preferable to certain other types of single phase motor constructions such as the shaded pole or induction disk types in that the capacitor motors operate with a higher power factor and have an appreciably greater starting and running torque.

The system also includes a circuit connected in shunt with the condenser 18 in which a second phase displacement means 25 is connected and which, when energized, is operable to negative the function of the phase displacement means 18. As here shown, the phase displacement means 25 is in the nature of a reactor, and when connected in circuit with the coil 17 the inductive reactance is of such a value that the current in the winding 17 slightly lags the current in winding 14. Accordingly, when the reactor is energized, the rotating field is reversed, causing the rotor 12 to stop. This shunt circuit is connected through contacts 26, 27 of a normally open switch associated with the motor 10 and which are closed periodically by an arm 28 rotatable with the shaft 13. The stationary contact 27 is connected to contact 29 which is normally in engagement with a contact 30 connected to the opposite side of the source $L^2$, as by wire 31. The contacts 29, 30 are associated with the control apparatus 11 which may consist of a motor 32 operable to effect rotation of a cam disk 33 provided with a notch 34, whereby the contact 29 is permitted to periodically move out of engagement with the contact 30.

The arm 27 of each of the motors 10 is adjustable circumferentially of the shaft 13. With this arrangement, once during each revolution of the arm 28, the associated contacts 26, 27 are closed. However, if the motor is in synchronism with the motor 32, the contacts 29, 30 will be opened and accordingly, the reactor 25 will not be energized. If the motor 10 is not in step with the motor 32, the contacts 29, 30 will be closed and the reactor 25 will be connected to the source $L^2$ and the motor will be stopped until the disk 33 of the master control has been rotated sufficiently to effect separation of the contacts 29, 30, at which time the reactor will be deenergized and the motor 10 will start immediately in view of the fact that the field windings 14, 17 have not been disconnected from the source.

I have found that the system as above described is a particularly efficient and economical means for resynchronizing motors of the capacitor start, capacitor run type, whereby the inherent advantages of such motors are available for use in a synchronized system.

What I claim is:

1. In a system for synchronizing a plurality of single phase motors, each of said motors including a rotor, a first field winding connected across the line, a second field winding connected across the line in series with a phase displacement means operable to effect a phase displacement in said winding, whereby said windings produce a rotating field, a second phase displacement means connected in shunt with said first displacement means and operable when energized to effect a phase displacement in said second winding in the opposite direction to cause said rotor to stop, said shunt circuit including normally open switch means operated by the rotor to periodically close said switch, the shunt circuit of each motor being connected through a normally closed switch, and means operable to periodically open said switch.

2. In a system for maintaining one or more single phase motors in synchronism with a master control, each of said motors including a rotor, a first field winding connected across the line, a second field winding connected across the line in series with means operable to cause the current in said second winding to lead the current in said first winding, whereby said windings effect a rotating magnetic field to effect rotation of the rotor, a circuit connected in shunt with said means and including a second means which when energized negatives the operation of said first means to cause said rotor to stop, said shunt circuit including a normally open switch, means operable by the rotor to periodically close said switch, a normally closed switch, and means operable by the master control to periodically open said switch.

3. In a system for synchronizing a plurality of single phase motors with a master motor, each of said single phase motors including a rotor, a field winding connected across the line, a second field winding connected across the line in series with a capacitive reactance operable to cause the current in said second winding to lead the current in said first winding, thereby setting up a rotating magnetic field, a circuit connected in shunt with said capacitive reactance and including an inductive reactance operable when energized to cause the current in said second field winding to lag the current in said first winding effecting rotation of the rotor in the opposite direction, said shunt circuit also including a normally open switch, means operable by the rotor to periodically close said switch, and said circuit including a normally closed switch and means operable by the master motor to periodically open said switch.

WALTER M. JEFFERS.